United States Patent [19]
Bajorek et al.

[11] 4,024,489
[45] May 17, 1977

[54] MAGNETORESISTIVE SANDWICH INCLUDING SENSOR ELECTRICALLY PARALLEL WITH ELECTRICAL SHUNT AND MAGNETIC BIASING LAYERS

[75] Inventors: Christopher Henry Bajorek, Goldens Bridge; Robert Douglas Hempstead, Yorktown Heights; Sol Krongelb; Ashok Frank Mayadas, both of Somers, all of N.Y.

[73] Assignee: International Business Machines Corporation, Armonk, N.Y.

[22] Filed: Nov. 18, 1975

[21] Appl. No.: 633,047

[52] U.S. Cl. .............................. 338/32 R; 324/46; 428/216; 428/413; 428/433; 428/900; 428/660; 428/666; 428/667; 428/209; 428/210
[51] Int. Cl.² .................. H01H 39/00; G11B 5/30; H01C 7/16
[58] Field of Search ............. 340/174 EB; 360/113; 428/900, 216, 413, 433, 209, 210; 427/103, 131, 132; 29/195 G, 195 M, 194, 198, 183 S, 191; 324/46; 338/32 R

[56] References Cited
UNITED STATES PATENTS

| | | | |
|---|---|---|---|
| 3,813,692 | 5/1974 | Brock | 360/113 |
| 3,814,863 | 6/1974 | O'Day | 360/113 |
| 3,864,751 | 2/1975 | Beaulieu | 360/113 |
| 3,940,797 | 2/1976 | Brock | 360/113 |
| 3,945,038 | 3/1976 | Lazzasi | 360/113 |
| 3,947,889 | 3/1976 | Lazzasi | 360/113 |

OTHER PUBLICATIONS

Hendel et al., IBM Tech. Dis. Bull., vol. 15, No. 8, p. 2649, *Laminated Structure for Bubble Domain Devices* (1-1973).
Nepela, IBM Tech. Dis. Bull, *Resistive Element . . . Head*, vol. 17, No. 9, p. 2759-2760, (2-1975).

*Primary Examiner*—Michael F. Esposito
*Attorney, Agent, or Firm*—Graham S. Jones, II

[57] ABSTRACT

A magnetoresistive permalloy film is deposited upon a substrate and coated with a separating layer composed of titanium or a similar high resistivity, conductive material. A soft biasing layer of a material such as permalloy or a hard biasing material such as cobalt chromium is deposited upon the separating layer to complete a sandwich. All layers are coextensive in outline because their outlines are formed by a single etching step.

14 Claims, 9 Drawing Figures

MAGNETORESISTIVE SANDWICH INCLUDING SENSOR ELECTRICALLY PARALLEL WITH ELECTRICAL SHUNT AND MAGNETIC BIASING LAYERS

BACKGROUND OF THE INVENTION

1. Field of the Invention

This invention relates to dynamic magnetic information storage and retrieval and, ore particularly, to heads which are magnetoresistive, and to sensors of magnetic fields in general.

2. Description of the Prior Art

Commonly assigned U.S. Pat. No. 3,864,751 of Beaulieu et al for an "Induced Bias Magnetoresistive Read Transducer" shows a magnetoresistive sensor 10 deposited on an insulating layer 12 on a magnetic shield 20. In FIG. 5 of that patent a shunt bias layer 26 of titanium can be provided. The magnetoresistive sensor 10 and the layer 26, if present, are then covered by $SiO_2$ insulating layers 14 or 27 on which is deposited a bias film 16 of Permalloy. Thus, the magnetoresistive sensor or the layer 26 is separated from the bias layer by $SiO_2$ which we have discovered can have spurious electrical breakdowns causing variations in resistance which produces spurious signals and can lead to degraded magnetic and electrical characteristics. Previously, it had been thought, as shown by Beaulieu et al and commonly assigned Voegeli U.S. Pat. No. 3,860,965, that the normal provision of insulation was necessary probably in order to prevent degradation of the signal in Beaulieu et al and in order to function in the case of the Voegeli patent and in a publication by O'Day entitled, "Balanced Magnetic Head," IBM Technical Disclosure Bulletin, Vol. 15, No. 9, Feb. 1973, p. 2680.

In addition, Beaulieu et al provides a structure which makes it very difficult to provide contact with the lower magnetoresistive sensor because the conductor requires a discontinuity in the structure, causing Barkhausen noise and potential short circuits.

The fact has been discovered by experimentation that if insulation is used, it must be on the order of 1000A thick or thicker to be reliable whereas magnetic efficiency considerations require an insulation on the order of 200A thick, which leads to the unreliability and degradation characteristics referred to above.

The O'Day U.S. Pat. No. 3,814,863 and Brock et al U.S. Pat. No. 3,813,692 are commonly assigned and both show an MR layer deposited on a substrate covered with a layer of titanium which does not rely on magnetic bias but which uses current flowing through the titanium film to provide the bias instead. This form of bias is less effective because it requires much larger bias currents, thus producing excessive heat, and is critically dependent upon spacing in the gaps.

SUMMARY

In accordance with this invention, the magnetoresistive (MR) film is deposited on a smooth substrate. The sequence of deposition is important for smoothness of the surface on which the MR film is deposited, since smoothness determines the quality of the MR film. A smooth substrate provides a higher quality film with reduced dispersion and lower coercivity. Both are desirable for reduction of Barkhausen noise. An intermediate layer of a thin film of a high resistivity, conductive material, such as titanium, is deposited directly upon the film of magnetoresistive material. The titanium is deposited under low temperature conditions which yield a smooth surface. A thin film of magnetic biasing material is deposited directly upon the intermediate layer.

An object of this invention is to provide a magnetoresistive sensor having a bias layer without spurious electrical breakdowns and with excellent magnetic and electrical characteristics.

DESCRIPTION OF THE PREFERRED EMBODIMENT

Figure 1A:
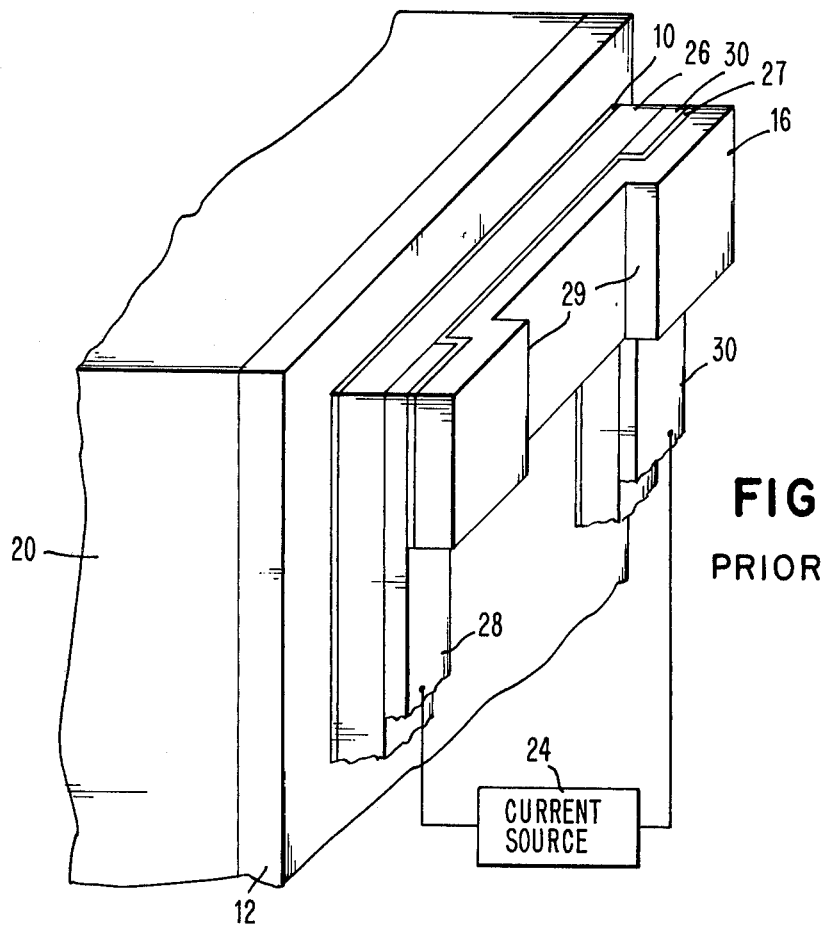
FIG. 1A shows a perspective view of a prior art form of magnetoresistive sensor structure (with a top shield and dielectric omitted) interpreted to show what would seem to be the most favorable specific embodiment.
Figure 1B:
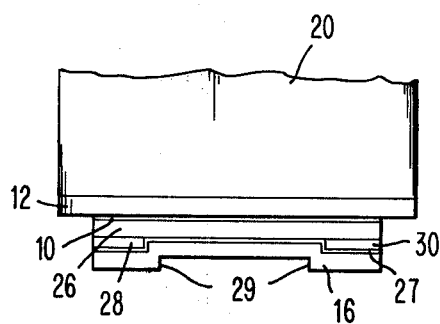
FIG. 1B shows a plan view of the head of FIG. 1A.
Figure 1C:
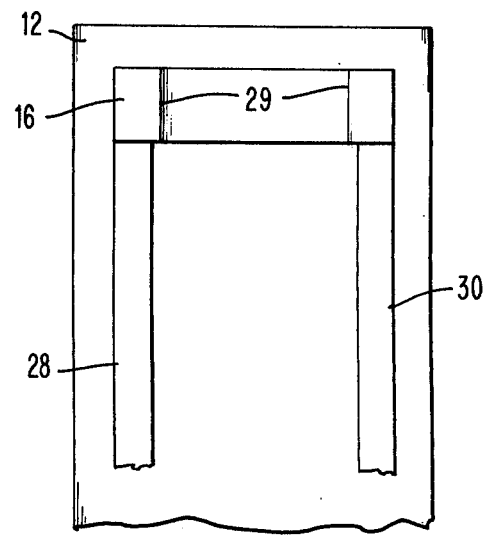
FIG. 1C shows a front elevation view of the head of FIG. 1A.
Figure 5:
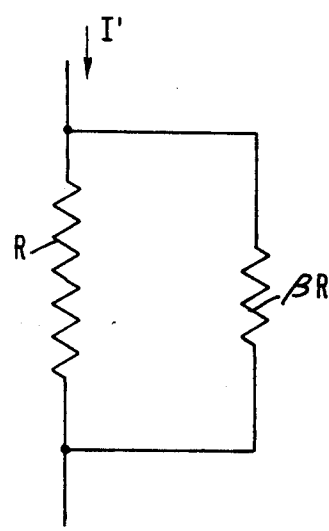
FIG. 5 shows an equivalent electrical circuit for the invention as embodied in FIGS. 2A-2C.

In FIGS. 1A–C, a modification of the arrangement shown in FIG. 5 of U.S. Pat. No. 3,864,751 of Beaulieu et al is shown. A substrate 20 comprising a magnetic shield is covered with an insulating layer 12. On the layer 12 is vacuum deposited a layer of a magnetoresistive element 10. Upon the layer 10 is deposited a shunt layer 26 which is nonmagnetic but of comparable resistivity and adapted to carry a comparable current composed of a material such as titanium. An insulation layer 27 is deposited upon shunt layer 26, and a layer of a bias film 16 which can be composed of a Permalloy composition (80% Ni, 20% Fe). The Beaulieu et al patent does not deal in detail with the issue of location of the conductor leads 28 and 30 which connect the sensor layer 10 and shunt layer 26 to the current source 24. However, in thin film technologies, such considerations are important. It would appear that the best way to connect layer 10 and 26 to leads 28 and 30 is as shown in FIG. 1, with leads 28 and 30 extending under insulation layer 27 and bias film 16. In order to provide adequate current to the layers 10 and 26, the conductors 28 and 30 must be on the order of 1000A thick which creates a step over which insulation layer 27 and bias layer 16 must extend. This leads to the problem of short circuits through the insulation 27 which is preferably only about 200A thick and which cannot be controlled in thickness very well at edges 29 where the thickness of the leads (about 1000A) should be thicker than the film 27. Note that Beaulieu et al call for insulation layers of about 2000A thickness and yet call for a separation between MR layer 10 and bias layer 16 of only 500 to 1000A, which creates a conflict since the 200A thickness of shunt layer 26, plus a 2000A layer 27 would separate the layers by about 2200A or twice the desired thickness. In any event, there is an additional problem in that extension of bias layer 16 over leads 28 and 30 causes a serious magnetic discontinuity. At edges 29, the bias layer will have a vertical inclination causing discontinuities in magnetic directional orientation which can produce Barkhausen noise attributable to magnetic domains at edges 29.

Figure 2A:
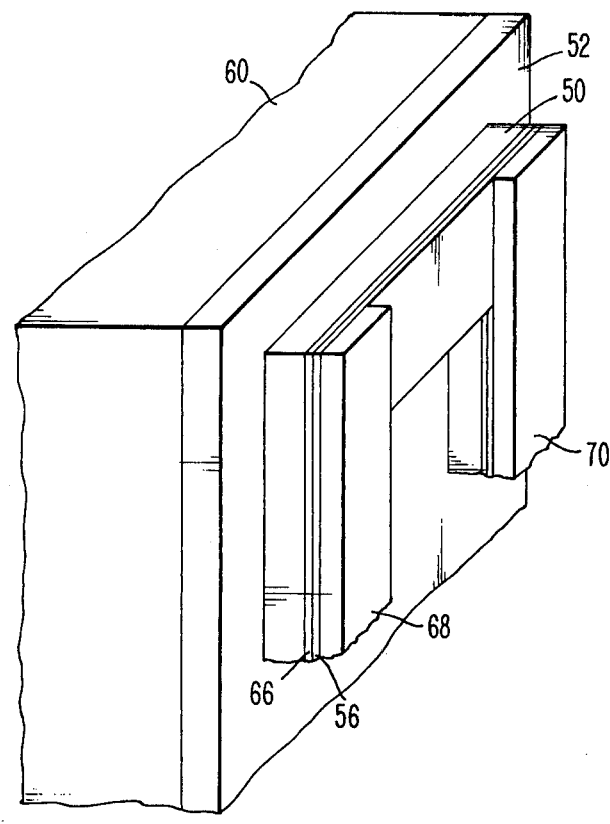
FIG. 2A shows a perspective view of a magnetoresistive sensor structure in accordance with this invention.
Figure 2B:
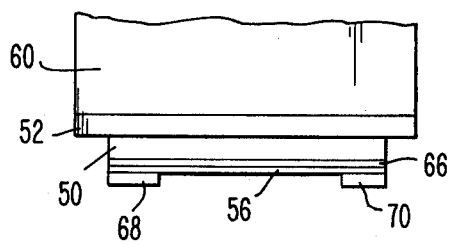
FIG. 2B shows a plan view of the head of FIG. 2A.
Figure 2C:
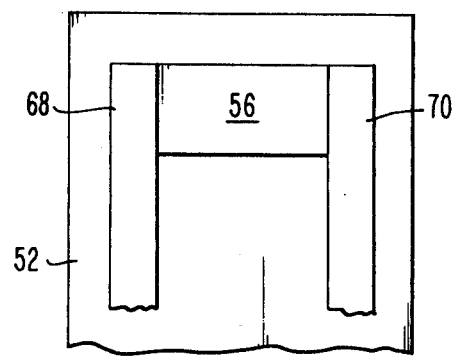
FIG. 2C shows a front elevational view of the head of FIG. 2A.

FIGS. 2A-C show a similar magnetoresistive sensor to that shown in FIGS. 1A-C modified in accordance with this invention. A substrate 60 is coated with dielectric layer 52 composed preferably of glass. A magnetoresistive sensor thin film layer 50 such as Permalloy nickel-iron about 200A–600A thick is deposited by evaporation at a substrate temperature near 250° C on the smooth dielectric layer 52 to provide an excellent magnetoresistor. A thin film 66 about 100A to 200A thick of a high resistivity conductor such as titanium is deposited upon sensor layer 50 at room temperature to reduce grain size of the titanium. Then finally a thin film layer 56 about 140A to 425A thick of a hard or soft magnetic biasing material such as Permalloy nickel-iron, or CoCr is deposited upon film 66. When made from the same material as the magnetoresistive layer 50, layer 56 should be about 0.707 of the thickness of magnetoresistive layer 50. An inverted U-shaped outline is formed by selective etching of all three layers through use of a single photoresist pattern or the equivalent to provide a sensor stripe plus support for the electrical leads 68 and 70 which are deposited upon the legs of the inverted U-shape formed by etching or the equivalent. However, the shape of the MR sensor sandwich can also be a rectangular one with the leads stepping over it. The low temperature technique of depositing the shunt layer 66 results in minimization of the increase in coercivity normally observed in depositing magnetic material over a layer because of the reduced grain size of shunt layer 66.

Note that layer 56 is selected to be thinner than layer 50 when using Permalloy nickel-iron so that it will be saturated and will not be capable of exhibiting the magnetoresistive effect. Such saturation is imposed by the magnetic field generated by the sensor 50 and the shunt layer 66.

Figure 3:
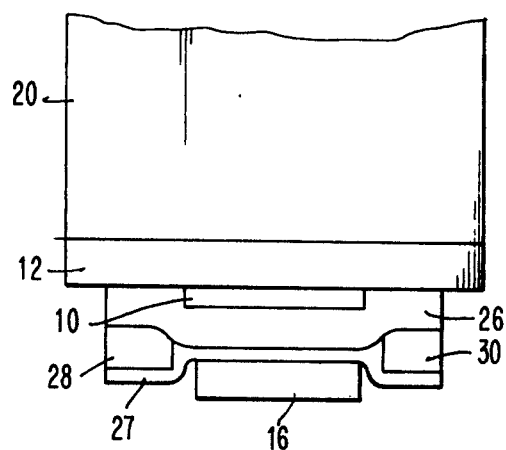
FIG. 3 is a plan view of a modification of FIG. 1A.

Modifications can be made upon the Beaulieu et al patent as shown in FIGS. 1A-C to clarify the way in which the conductors would be connected to the magnetoresistor 10 which is very much left to speculation by the schematic electrical leads shown in that patent. One possibility is that there would be thin film conductors aligned to butt with the edge of the MR sensor 10 but that would be very difficult to achieve because of the extremely small dimensions involved which would make alignment almost impossible. A possible modification based upon the use of a titanium layer on top of MR sensor 10 is shown in FIG. 3 in which the titanium shunt layer 26 extends beyond the upper and lower ends of sensor 10. However, sensor 10 would have to be formed into an inverted U-shaped form prior to deposition of shunt layer 26. Then layer 26 would have to be etched prior to deposition of conductors 28 and 30, insulating layer 27 and bias layer 26. Thus, layer 26 would have its shape formed separately from layer 26 after several intervening steps. The configurations of layers 10 and 16 after etching should be identical and perfectly aligned to avoid substantially increasing Barkhausen noise. Achieving that degree of alignment would impose impossible fabrication problems. From a practical point of view, such alignment is not possible without a procedure whereby the three layers are etched simultaneously as is possible in the arrangements of FIGS. 1A-C and 2A-C. The arrangement of FIG. 3 is also unsatisfactory because it would provide a nonuniform magnetic bias since sensor 10 extends beyond bias layer 16.

Figure 4:
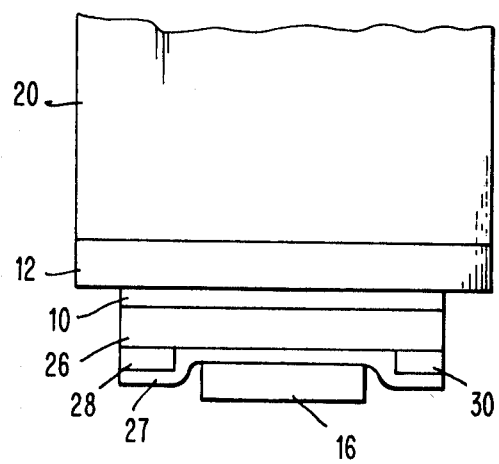
FIG. 4 is a plan view of another modification of FIG. 1A.

FIG. 4 shows another modified arrangement of the Beaulieu et al patent which will eliminate short circuits, but which also suffers the fabrication difficulties of the above-mentioned case.

A question which is immediately raised by placing the shunt and bias layers electrically in parallel with the magnetoresistor as in FIGS. 2A-C is one of the degree to which the parasitic shunt resistances of those layers degrade the signal output.

In FIG. 5, an equivalent electrical schematic circuit for the sandwich of FIGS. 2A-C is shown. A biased magnetoresistor of resistance R without any shunt has an AC output voltage of $I\Delta R$ where $\Delta R$ is the change of resistance caused by a magnetic field, and where the sensing current I is limited by power dissipation considerations ($I^2R$).

A biased magnetoresistor of resistance R with a shunt of resistance $\beta R$ has an output AC voltage of $I'\Delta R\beta/1+\beta$. However, $I'$ can be of a larger value than I since the magneto-resistor-shunt combination can withstand a higher current than the magnetoresistor alone at equal power dissipation $I'_2R\beta/1+\beta$).

For the dimensions and materials described above for FIGS. 2A–2C, the value of $\beta$ is near 1 and $I'$ equals about 1.4I. Therefore, the sensor of FIG. 2A-C provides 70% of the maximum output signal of a magnetoresistor without a shunt. This is considered to be a negligible loss of signal amplitude in view of elimination of the unreliability caused by the breakdown of the thin insulating layers which were required by Beaulieu et al.

What is claimed is:

1. A thin film magnetoresistive sensor consisting of a smooth substrate surface,
    a first thin film layer of a magnetoresistive sensor material deposited upon said substrate surface,
    an intermediate nonmagnetic thin film separating, shunt layer comprising a relatively high resistivity nonmagnetic material in physical and electrical contact with said first layer,
    an upper biasing thin film layer of an electrically conductive, magnetic biasing material for magnetically biasing said first layer deposited upon said intermediate layer in physical and electrical contact with said intermediate layer.

2. A sensor in accordance with claim 1 wherein said upper layer comprises a hard magnetic biasing material.

3. A sensor in accordance with claim 2 wherein said hard magnetic biasing layer includes a cobalt-chromium alloy.

4. A sensor in accordance with claim 1 wherein said first layer comprises nickel iron on the order of 200A –600A thick, said intermediate layer comprises titanium on the order of 100A –200A thick and said upper layer comprises nickel iron on the order of 140A –425A thick.

5. A sensor in accordance with claim 1 wherein said intermediate layer is composed of titanium.

6. A sensor in accordance with claim 1 wherein said bias layer comprises a layer of substantially the same material as said sensor material and on the order of 0.707 of the thickness of said magnetoresistive layer.

7. A sensor in accordance with claim 1 wherein the sandwich of three layers has a single U-shaped outline formed by etching with a single developed resist layer, whereby said head has lower Barkhausen noise.

8. A sensor in accordance with claim 1 wherein conductor leads are deposited upon said upper thin film layer for electrical connection of said sensor in an electrical circuit.

9. A sensor in accordance with claim 1 wherein said magnetoresistive sensor comprises a strip consisting of said three layers having electrical connections to the ends thereof adapted to provide an electrical current through said three layers and causing said sensor layer and said separating layer to cause magnetic saturation of said biasing layer for biasing it beyond exhibiting the magnetoresistive effect.

10. A sensor in accordance with claim 1 wherein said biasing layer comprises a magnetoresistive material magnetically biased into magnetic saturation to be incapable of exhibiting the magnetoresistive effect.

11. A sensor in accordance with claim 1 wherein said separating layer is very thin as compared with said first layer and said biasing layer, whereby only a small shunt current passes therethrough producing a very small magnetic field, and
said biasing layer provides a far more substantial magnetic field sufficient to bias said first layer magnetically.

12. A sensor in accordance with claim 11 wherein said biasing layer comprises a magnetically hard magnetic material.

13. A sensor in accordance with claim 12 wherein said biasing layer consists essentially of cobalt chromium.

14. A sensor in accordance with claim 1 wherein said biasing layer and said first layer consist essentially of nickel iron and said biasing layer is substantially 0.707 as thick as said first layer.

* * * * *